(No Model.) 2 Sheets—Sheet 1.

R. MACKIE & N. McCARTY.
SYSTEM OF ELECTRIC LIGHTING.

No. 337,004. Patented Mar. 2, 1886.

(No Model.) 2 Sheets—Sheet 2.
R. MACKIE & N. McCARTY.
SYSTEM OF ELECTRIC LIGHTING.
No. 337,004. Patented Mar. 2, 1886.
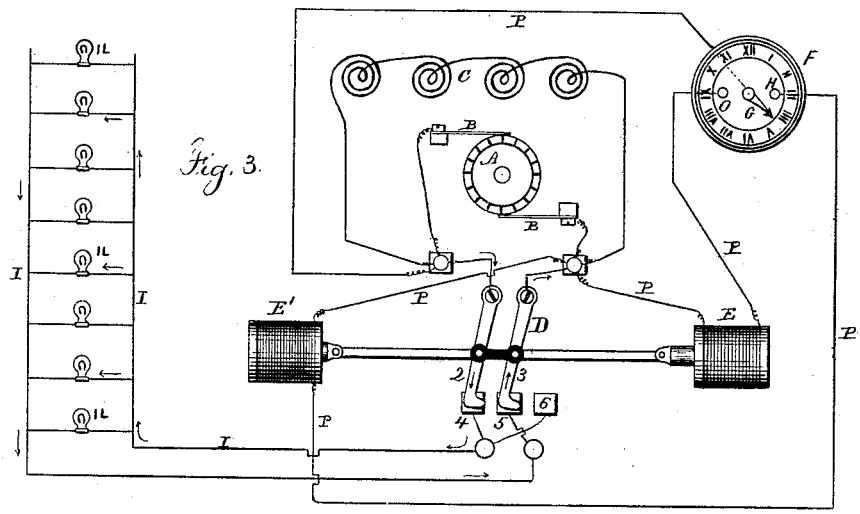
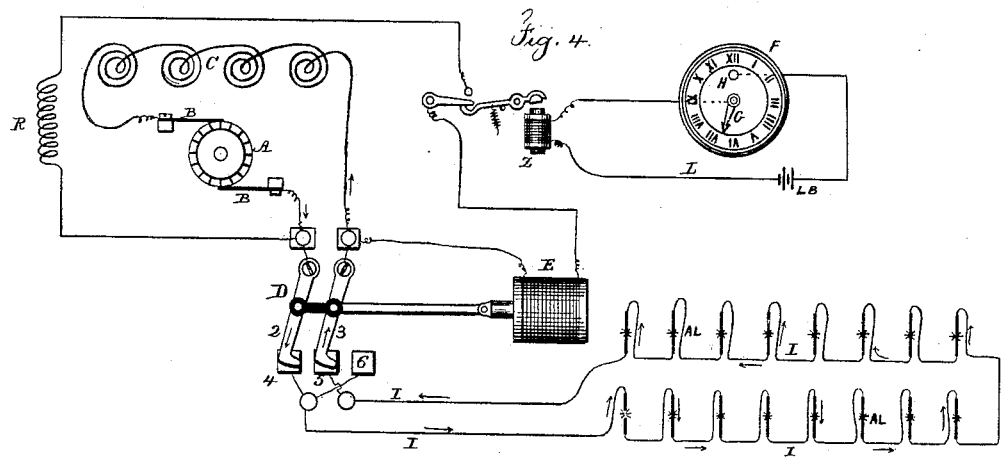
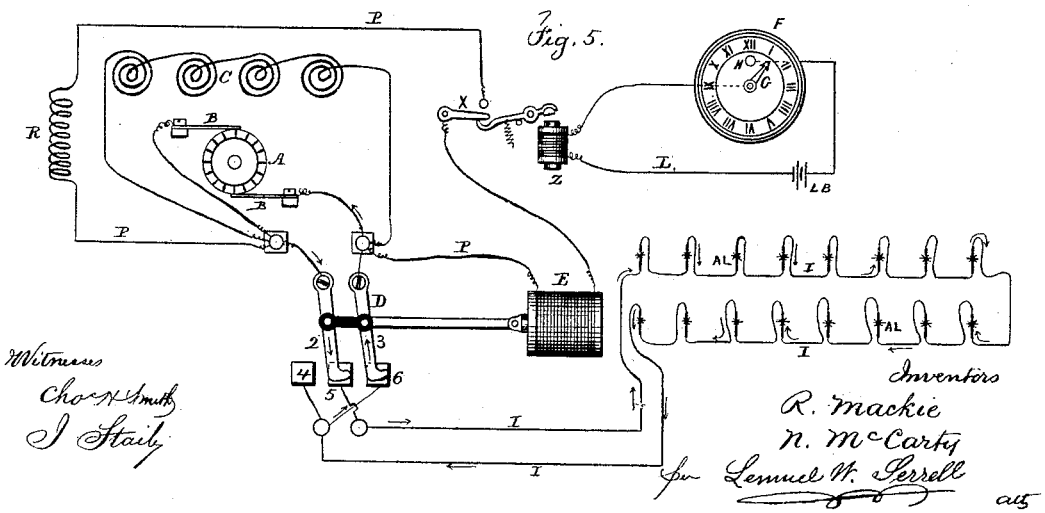

UNITED STATES PATENT OFFICE.

ROBB MACKIE, OF TROY, AND NORMAN McCARTY, OF HOOSICK, ASSIGNORS TO JOHN B. TIBBITS, OF HOOSICK, NEW YORK.

SYSTEM OF ELECTRIC LIGHTING.

SPECIFICATION forming part of Letters Patent No. 337,004, dated March 2, 1886.

Application filed March 9, 1885. Serial No. 158,164. (No model.)

*To all whom it may concern:*

Be it known that we, ROBB MACKIE, of Troy, Rensselaer county, and NORMAN MC-CARTY, of Hoosick, both in the State of New York, have invented an Improvement in Electric Lighting, of which the following is a specification.

The object of our invention is to enable an electric-arc lamp to be run for a longer period of time with a given size of carbons than formerly, and to prolong the life of the carbon filament when our invention is applied to incandescent electric lamps. It is well known that the positive carbon in an electric-arc lamp is consumed with greater rapidity than the negative carbon, the ratio being about two to one. We take advantage of this fact in our system of electric lighting and reverse the current in the lamp-circuit at stated intervals, so that the positive carbon by the change in the direction of the current becomes the negative carbon, and the negative carbon becomes the positive. By this means we equalize the consumption of the carbons, and are enabled to use positive and negative carbons of the same length, and at the same time the lamp can be run for a longer period of time with a given sized carbon than heretofore, and there is no waste of carbon. We employ a switch for reversing the direction of the current in the lamp-circuit, and this switch is operated by an electro-magnet or solenoid in a shunt-circuit from the dynamo-electric machine. This shunt-circuit is closed automatically at stated intervals by clock mechanism.

Figure 1:
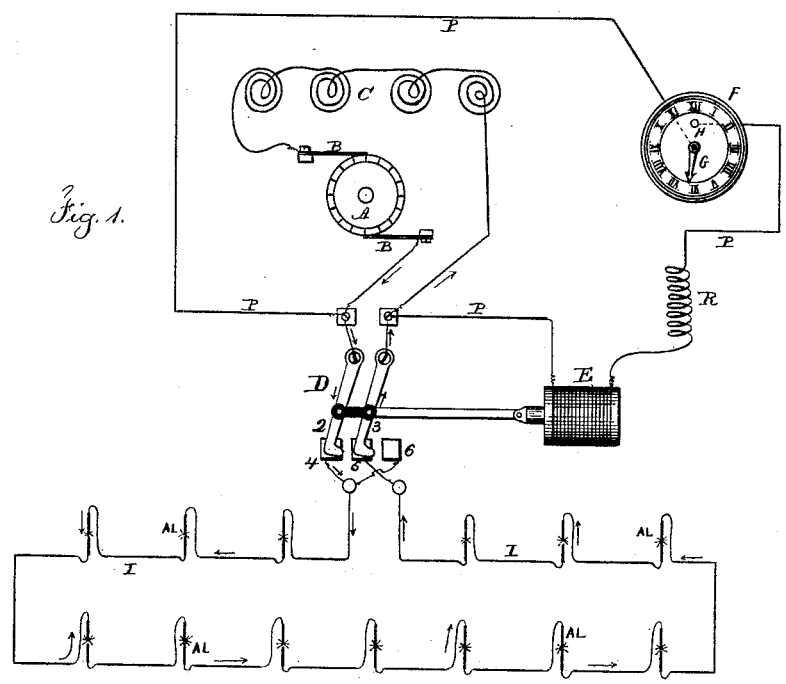
Figure 2:
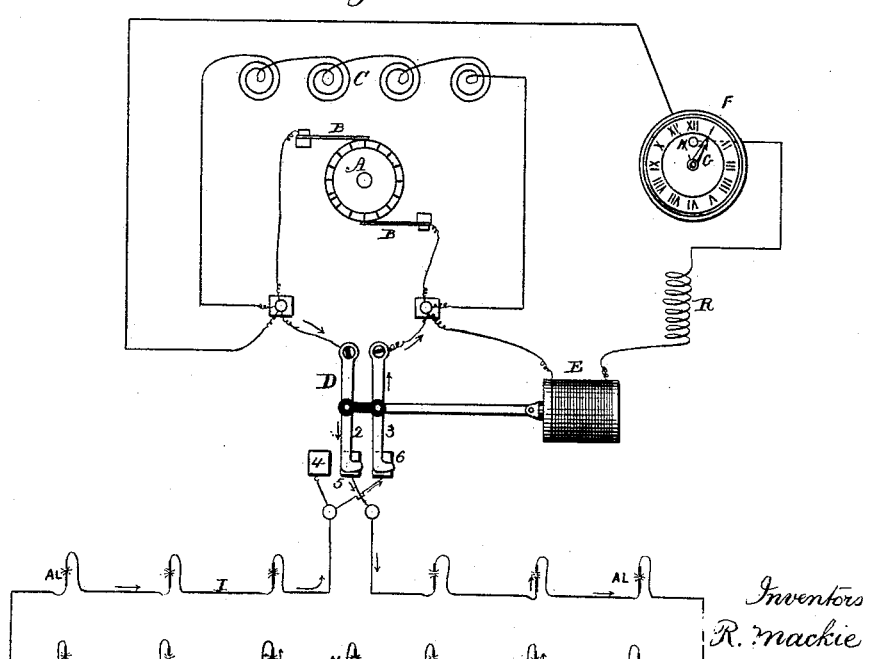

In the drawings, Figure 1 is a diagram illustrating our invention where the magnets of the dynamo-electric machine are in series. Fig. 2 is a similar view with the magnets of the dynamo in a shunt. Fig. 3 is a diagram representing the devices and connections for reversing the current every six hours. Fig. 4 represents the clock mechanism in a local-battery circuit containing an electro-magnet that moves a switch to close the shunt-circuit when the local circuit is closed at the clock. Fig. 5 is similar to Fig. 4, excepting that the magnets of the dynamo are in a shunt-circuit.

In the diagrams, A represents the commutator, B the brushes, and C C the field-magnets of a dynamo-electric machine. In Figs. 1 and 4 these magnets are in series, and in Figs. 2, 3, 5 they are shown as in a shunt-circuit.

I is the working or lamp circuit, containing arc-lamps at A L and incandescent lamps at I L.

D is the reversing-switch, composed of two pivoted arms, 2 3, connected by a bar of insulating material. The arm 2, Figs. 1 and 4, is connected by a wire with the brush B, and the arm 3 is connected to the coils C C.

4, 5, and 6 are contact-blocks, to which the ends of the lamp-circuit I are connected.

F represents a clock of ordinary character, except that it has one or more insulated metallic contacts, H, upon its face, and to this contact H one end of the shunt-circuit wire P is connected, the other end of said wire being attached to some metallic part of the clock. In this shunt-circuit P there is an electro-magnet or solenoid E. We have shown the latter and its movable core as connected by a rod with the reversing-switch D.

In operating arc lamps upon our system we use carbons of the same length for the upper and lower holders, and these carbons are to be of a proper length according to the time it is desired to have the lamp burn before replacing the carbons. If the lamp is to run for twelve hours, the carbons should each be about twelve inches long, and when the lamp is started the hand upon the clock, if the clock contains but one contact H, should be so placed that it will require the hand G, say, six hours to reach the contact, and the switch D must occupy the position shown in Fig. 1, with the arm 2 upon the contact 4 and the arm 3 upon the contact 5. The current from the dynamo now flows in the lamp-circuit I in the direction of the arrows, and the upper carbon, Fig. 1, is now the positive carbon and the lower carbon the negative. At the end of six hours about six inches of the positive carbon and three inches of the negative carbon have been consumed, and at this time the hand G of the clock reaches the contact H, and the shunt-circuit P is closed. The solenoid now attracts its core, and moves the switch D so that the arm 2 is upon the contact 5 and the arm 3 upon the contact 6, as shown in Fig. 2. The flow of the current is now reversed in the lamp-circuit I, as indicated by the arrows in said Fig. 2, and the lower carbon becomes the positive carbon and the upper carbon the negative. The lamp will burn for another period of six hours, at the end of which time there will be about three inches of unconsumed carbon in each holder. It is preferable to place a resistance, R, in the shunt-circuit P, in order that only a small portion of the current from the dynamo shall pass through the shunt-circuit when said circuit is closed. This shunt-circuit is opened as soon as the clock-hand passes off the contact H, and when the lamp is started with new carbons the switch D must be moved by hand to bring the arms 2 and 3 upon the contacts 4 and 5, as aforesaid.

In using incandescent electric lamps it is well known that the carbon filament generally breaks at the point of attachment with the positive conductor if the current is sent through the carbon in one direction for a long period of time. Therefore it has been the practice in some instances when a new carbon is placed in the circuit to reverse the direction of the flow of current through the carbon filaments in order to lengthen the life of said filaments.

In applying our invention to a system of incandescent electric lighting we automatically reverse the current at stated periods, so that for a certain period of time the current flows in one direction through the carbon filament and for the next period in the reverse direction, and so on. In Fig. 3 we have shown the devices and arrangement of circuits for carrying this into practice. The clock is provided with two contacts, H O, upon its face; hence the current will be reversed every six hours. Two solenoids, E E', are employed for actuating the reversing-switch D, one solenoid being connected with the contact H, the other with the contact O. When the hand G is upon the contact H, the circuit is closed through the solenoid E', and the switch D is moved to the left so that the arms 2 and 3 rest upon the contacts 4 and 5, and the current flows through the lamp-circuit I in the direction represented by the arrows, and continues in that direction until the hand G reaches the contact O, when the circuit to the solenoid E is closed, and the switch D is moved to the right, and the arms 2 and 3 brought upon the contacts 5 and 6. The current is now reversed and flows through the lamp-circuit I in the reverse direction to that represented by the arrows in said Fig. 3, and so continues until the hand G reaches the contact H, when the flow of current is again reversed.

It will be apparent that the number of contacts upon the clock-face may be varied, the number being determined by the interval of time between each reversal. This periodic reversal of the flow of current through the carbon filaments lessens the risk of their being broken or ruptured, and prolongs their usefulness to a marked extent.

The parts shown in Figs. 4 and 5 are the same as those represented in Figs. 1 and 2, excepting that the clock is in a local circuit, L, containing a battery, L B, and an electro-magnet, Z. When this local circuit is closed by the hand G resting on H, the electro-magnet Z is energized, and its armature-lever moves a switch, X, that closes the shunt P. The solenoid E now acts through its core to move the switch D, and the current through the lamp-circuit I is reversed, as before described.

It will be evident that an electro-magnet may replace the solenoid E or E', the armature-lever of the magnet acting to move the switch D.

We are aware that the carbons in an electric light have been rotated, and at the same time circuit-changing devices have been revolved so that the polarity of the current has been rapidly changed. We therefore do not claim this feature.

We claim as our invention—

1. The combination, with the dynamo-electric machine and its lamp-circuit containing lamps, of a circuit-changing switch in the lamp-circuit between the dynamo and the external or working circuit, and an automatic mechanism for moving the switch periodically and reversing the flow of current through the external working-circuit, substantially as set forth.

2. The combination, with a dynamo-electric machine and its lamp-circuit containing lamps, of a switch in said lamp-circuit, a shunt-circuit from the dynamo-electric machine, an electro-magnet or solenoid, and a circuit-closing clock in said shunt-circuit, and a connection from the electro-magnet or solenoid for moving the reversing-switch, substantially as set forth.

Signed by us this 25th day of February, A. D. 1885.

ROBB MACKIE.
NORMAN McCARTY.

Witnesses:
   GEO. H. MYERS,
   D. P. GRIFFITH.